D. M. Osborne.
Harvester Pitman.
No. 55,781. Patented Jun. 19, 1866.

Witnesses:
David Wright of Auburn N.Y.
Walter L Clifts

Inventor:
D M Osborne

UNITED STATES PATENT OFFICE.

DAVID M. OSBORNE, OF AUBURN, NEW YORK, ASSIGNOR TO HIMSELF AND WM. A. KIRBY, OF SAME PLACE.

IMPROVEMENT IN HARVESTERS.

Specification forming part of Letters Patent No. 55,781, dated June 19, 1866.

*To all whom it may concern:*

Be it known that I, DAVID M. OSBORNE, of the city of Auburn, in the county of Cayuga and State of New York, have invented certain new and useful Improvements in Pitman-Connections for Harvesting-Machines and other similar purposes; and I do hereby declare the following to be a clear, full, and exact description of the same, reference being had to the accompanying drawings, making a part of this specification, in which—

Figure 1:
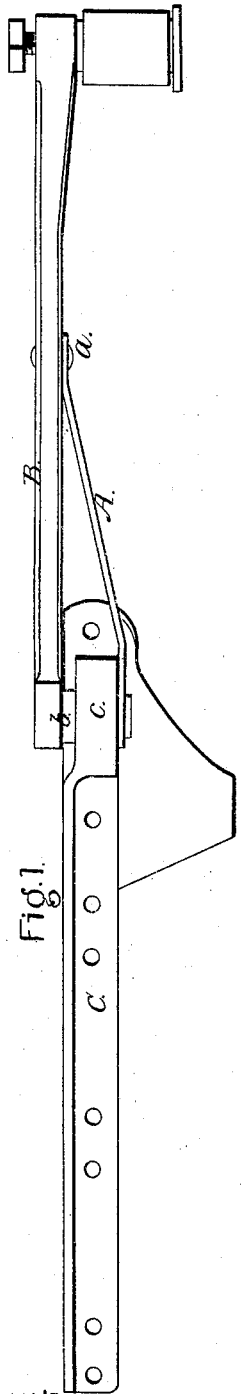
Figure 3:
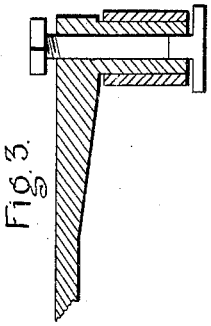
Figure 5:
Figure 2:
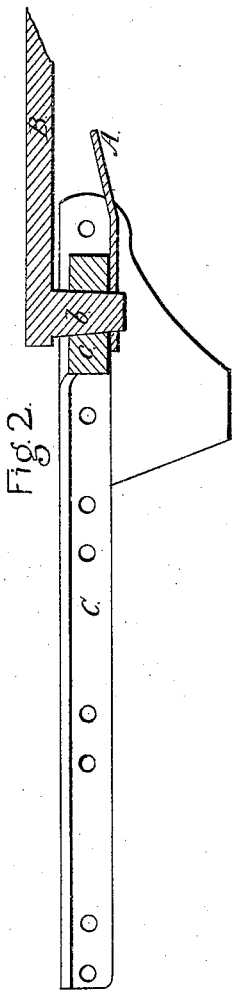
Figure 4:
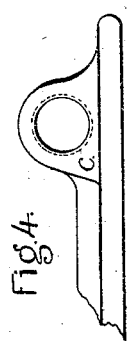
Figure 6:
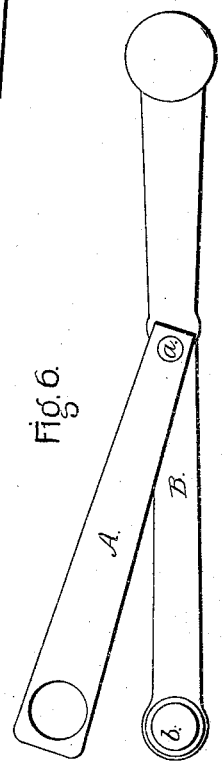

Figure 1 represents a pitman with its connection, as proposed by my invention, to the sickle or cutting apparatus of a harvester. Fig. 2 represents a horizontal section through the device for connecting and adjusting the pitman to the cutters. Figs. 3 and 5 represent sections through the wrist-pin connection of the pitman. Fig. 4 represents an elevation of the lug on the cutter-bar to which the pitman is attached. Fig. 6 represents a bird's-eye view of the pitman with the spring removed to one side, so that the pitman may be attached or detached from the cutter-bar.

Similar letters of reference, where they occur in the separate figures, denote like parts in all the drawings.

The speed with which the pitman of a harvester moves causes much and rapid wearing away of its attachments, and consequent upon this follows much of the clatter and noise made by these machines when in operation.

The object and purpose of my invention is to prevent as much as possible this wearing away and consequent noise, and to compensate for or provide against so much of the evil as cannot be avoided.

My invention consists in connecting the pitman to the cutters or cutter-bars by means of a single pin, $b$, let into or formed upon that end of the pitman which is to be connected with the cutters or cutter-bar, and by keeping it in its place in the lug of the cutters or cutter-bar by means of a self-adjusting spring, as is hereinafter more particularly described.

To enable others skilled in the art to make and use my invention, I will proceed to describe the same with reference to the drawings.

I make the pitman B in one piece, and insert in or form upon the end thereof the pin $b$. I make this pin $b$ in the form of the frustum of a cone, its sides rising at an angle of about eighty degrees, although I do not deem the exact or even approximate angle material. The hole through the lug $c$ upon the head of the cutters or cutter-bar must be made to correspond in shape with said pin $b$, but not so large as to allow said lug to come in contact with the pitman. This pin $b$ is made of sufficient length so as to pass through and sufficiently far beyond said lug to allow the self-adjusting spring A to be held in place thereby. This spring A, I make of spring-steel, (any other elastic metal will answer,) and, as before stated, it is riveted loosely at one end thereof to the pitman, and an aperture at the other end thereof is slipped over the upper end of the pin $b$, and is thereby held from moving laterally from its place. When thus in place this end of the spring A presses upon or against the side of the lug $c$ and causes the pin $b$ to press and fit snugly into the hole in said lug at all times, notwithstanding the wearing away in said lug or upon said pin, or both, and thereby also prevents much of the clatter and noise which would be made were said lug allowed to work more loosely upon said pin.

Having thus fully described the nature of my invention, what I claim therein as new, and desire to secure by Letters Patent, is—

Connecting the pitman of a harvesting-machine to the head of the cutter-bar or cutters, or connecting bars to their supports by means of a single pin and retaining said pin in place by means of a self-adjusting perforated spring, substantially as above described.

D. M. OSBORNE.

Witnesses:
 D. WIGHT,
 W. L. CLIFT.